(12) United States Patent
Baptist et al.

(10) Patent No.: US 10,055,291 B2
(45) Date of Patent: Aug. 21, 2018

(54) METHOD AND SYSTEM FOR PROCESSING DATA ACCESS REQUESTS DURING DATA TRANSFERS

(71) Applicant: International Business Machines Corporation, Armonk, NY (US)

(72) Inventors: Andrew D. Baptist, Mt. Pleasant, WI (US); Ravi V. Khadiwala, Bartlett, IL (US); Manish Motwani, Chicago, IL (US); Jason K. Resch, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 43 days.

(21) Appl. No.: 15/191,146

(22) Filed: Jun. 23, 2016

(65) Prior Publication Data

US 2017/0004043 A1    Jan. 5, 2017

Related U.S. Application Data

(60) Provisional application No. 62/186,590, filed on Jun. 30, 2015.

(51) Int. Cl.
*G06F 11/10* (2006.01)
*H04L 29/08* (2006.01)

(52) U.S. Cl.
CPC .......... *G06F 11/1076* (2013.01); *H04L 67/00* (2013.01); *G06F 2211/1028* (2013.01)

(58) Field of Classification Search
CPC .................................................. G06F 11/1076

USPC ......................... 714/764, 776, 766, 763, 819
See application file for complete search history.

(56) References Cited

U.S. PATENT DOCUMENTS

| | | | |
|---|---|---|---|
| 4,092,732 | A | 5/1978 | Ouchi |
| 5,454,101 | A | 9/1995 | Mackay et al. |
| 5,485,474 | A | 1/1996 | Rabin |
| 5,774,643 | A | 6/1998 | Lubbers et al. |
| 5,802,364 | A | 9/1998 | Senator et al. |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Fritz Alphonse
(74) *Attorney, Agent, or Firm* — Garlick & Markison; Timothy W. Markison; Randy W. Lacasse

(57) ABSTRACT

A method for execution by a storage unit of a dispersed storage network, the method comprises transitioning storage of one or more groups of encoded data slices from storage based on a previous version of a distributed agreement protocol to storage based on a new version of the distributed agreement protocol. While transitioning storage of the one or more groups of encoded data slices, receiving, from a requesting computing device, a data access request regarding an encoded data slice of the one or more groups of encoded data slices. Determining whether the encoded data slice has been transferred as a result of the transitioning. When the storage unit is currently storing the encoded data slice, processing the data access request. When the storage unit is not currently storing the encoded data slice, functioning as a proxy for the requesting computing device to fulfill the data access request.

14 Claims, 8 Drawing Sheets

(56) References Cited

U.S. PATENT DOCUMENTS

| | | |
|---|---|---|
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,082,500 B2 | 7/2006 | Scott et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 8,560,366 B2 | 10/2013 | Mikurak |
| 8,812,688 B2 | 8/2014 | Luukkala et al. |
| 8,862,800 B2 * | 10/2014 | Resch ............... G06F 3/0617 710/62 |
| 8,954,789 B2 * | 2/2015 | Rangachari ............ G06F 3/065 711/159 |
| 9,576,018 B2 * | 2/2017 | Resch ............... G06F 11/1076 |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma et al. |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula, Jr. |
| 2005/0132070 A1 | 6/2005 | Redlich et al. |
| 2005/0144382 A1 | 6/2005 | Schmisseur |
| 2005/0229069 A1 | 10/2005 | Hassner |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll, Jr. |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters, III et al. |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |
| 2011/0264989 A1 | 10/2011 | Resch et al. |
| 2013/0138862 A1 | 5/2013 | Motwani et al. |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

International Searching Authority; International Search Report and Written Opinion; International Application No. PCT/US2016/040020; dated Sep. 20, 2016; 8 pgs.

Wang, Storage Management in Large Distributed Object-Based Storage Systems. 2006; 195 pgs. [retrieved on Aug. 29, 2016]. Retrieved from the Internet.

* cited by examiner

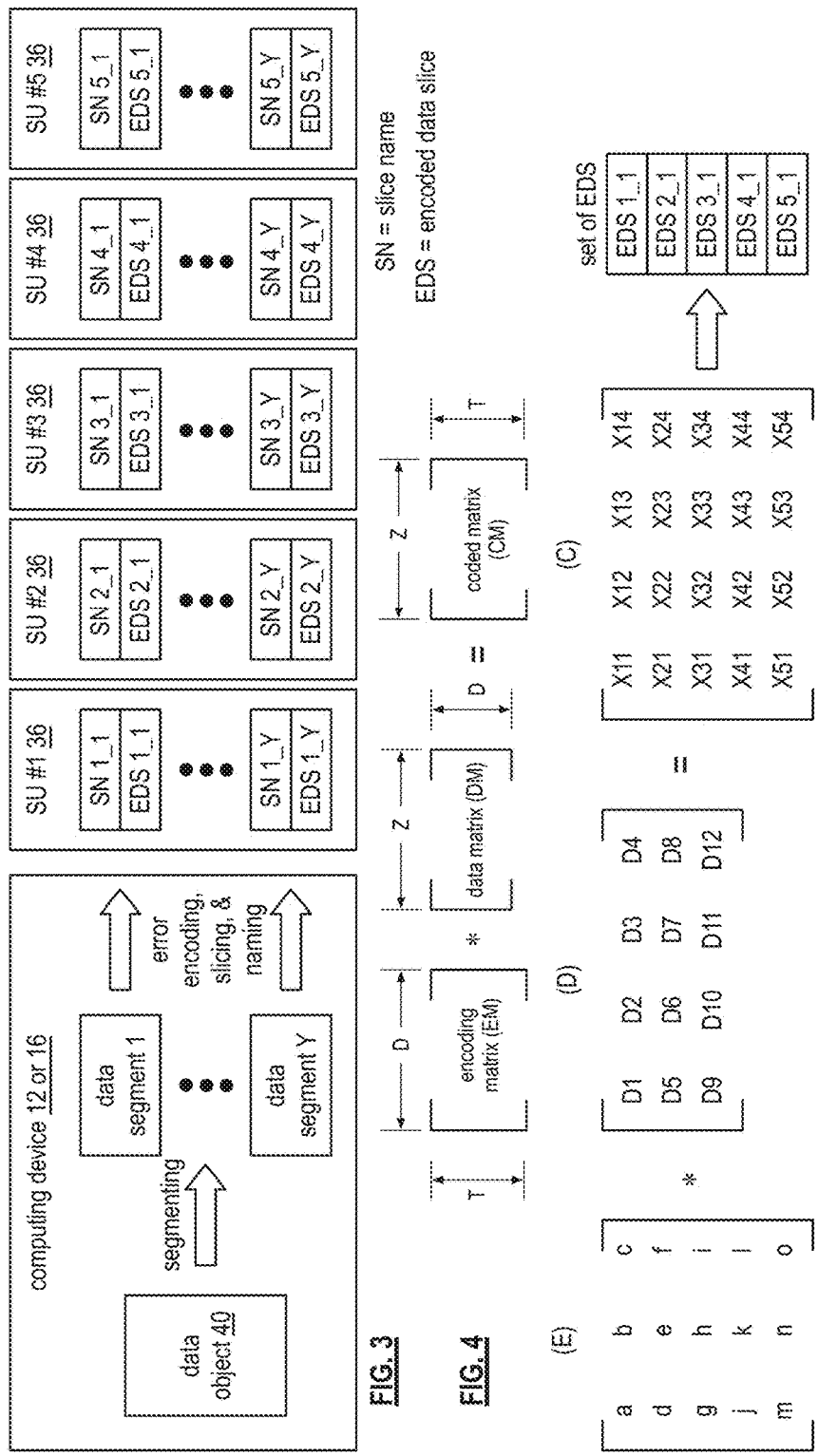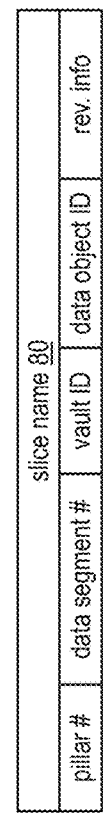

METHOD AND SYSTEM FOR PROCESSING DATA ACCESS REQUESTS DURING DATA TRANSFERS

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

In a dispersed storage system, from time to time, data is transferred from one storage unit to another. When there is a significant amount of data to be transferred, it takes time to accomplish the data transfer. During such data transfers, data access requests for the data being transferred are likely to be received.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
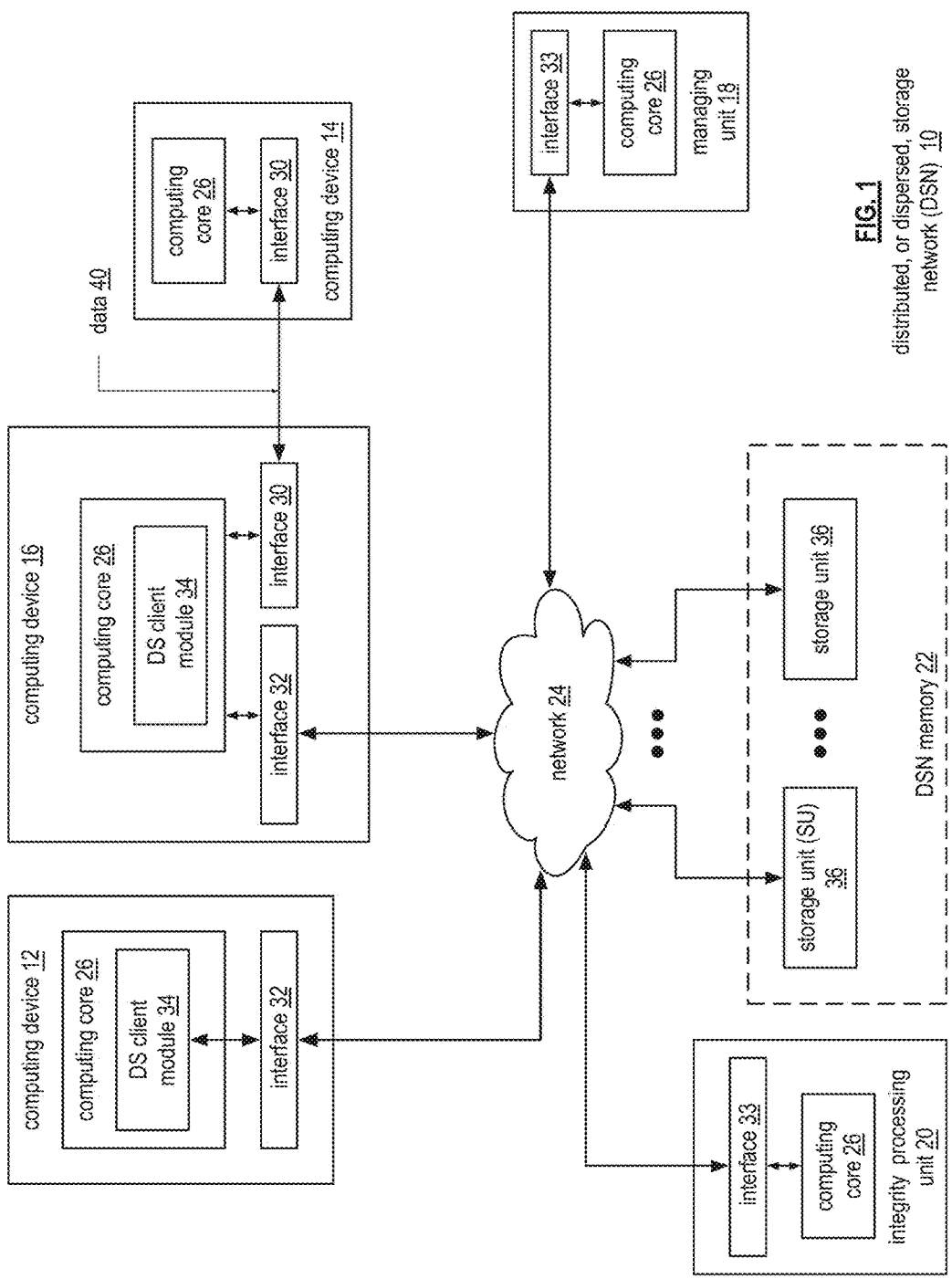
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
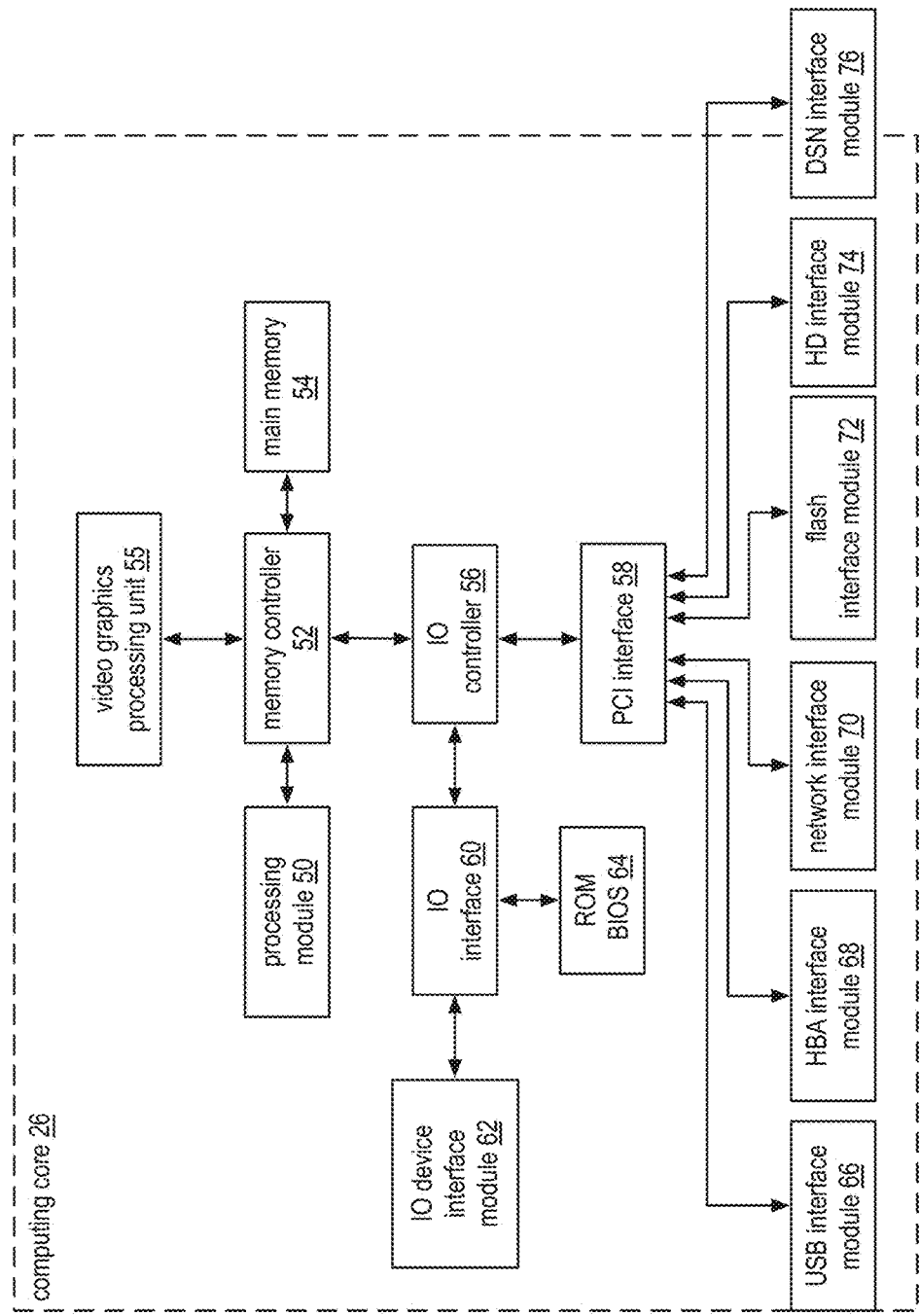
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate a per-access billing information. In another instance, the managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
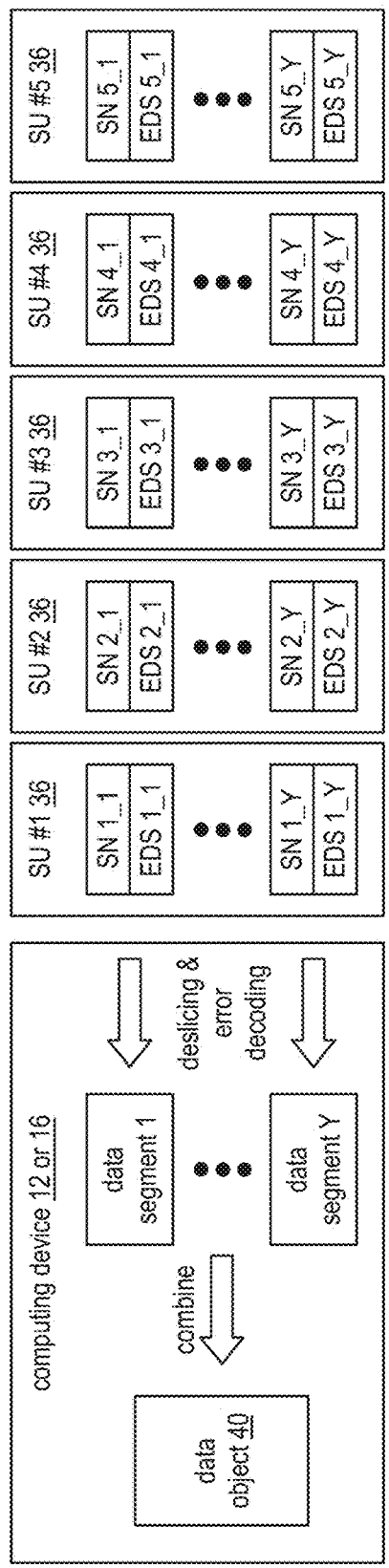
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
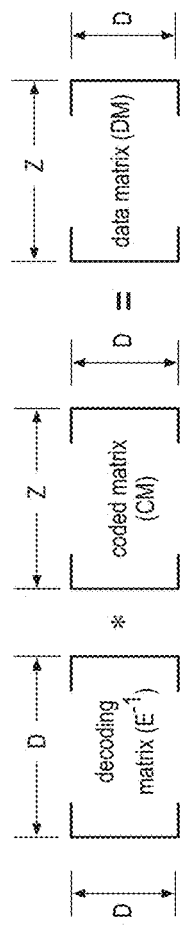
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9A:
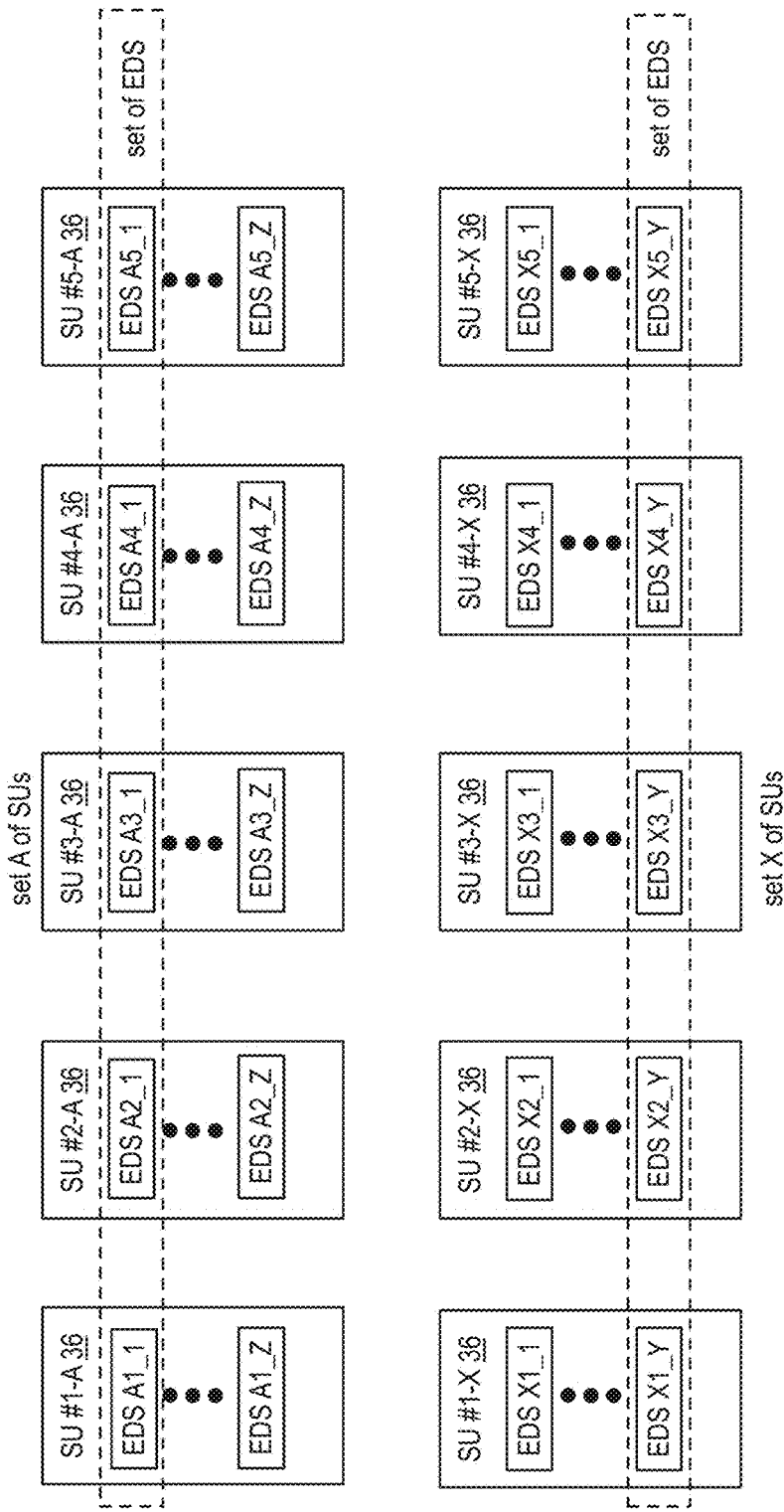
FIG. 9A is a schematic block diagram of an embodiment of a plurality of sets of storage units in accordance with the present invention.

FIG. 9A is a schematic block diagram of a plurality of storage units 36 of the DSN 10 arranged into a plurality of sets of storage units. A first set of storage units includes SU#1-A through SU#5-A and another set includes SU#1-X through SU#5-X. In this example, each set includes five storage units but could be more or less and, from set to set, the number of storage units per set may vary. Each set of storage unit stores sets of encoded data slices. For example, set A of storage units stores sets of encoded data slices 1 through Z, such that storage unit 1-A stores encoded data slices A1_1 through A1_Z, storage unit 2-A stores encoded data slices A2_1 through A2_Z, and so on. As another example, set X of storage units stores sets of encoded data slices 1 through Y, such that storage unit 1-X stores encoded data slices X1_1 through X1_Y, storage units 2-X stores encoded data slices X2_1 through X2_Y, and so on.

A distributed agreement protocol is used within the DSN to determine where a set of encoded data slices is to be stored. From time to time, the distributed agreement protocol will change as a result of adding a storage unit to the DSN, removing a storage unit from the DSN, adding memory to an existing storage unit, and/or for a variety of other reasons. When a change to the distributed agreement protocol occurs, some encoded data slices may need to be transferred from one storage unit to another. The distributed agreement protocol will be described in greater detail with reference to FIG. 10.

Figure 9B:
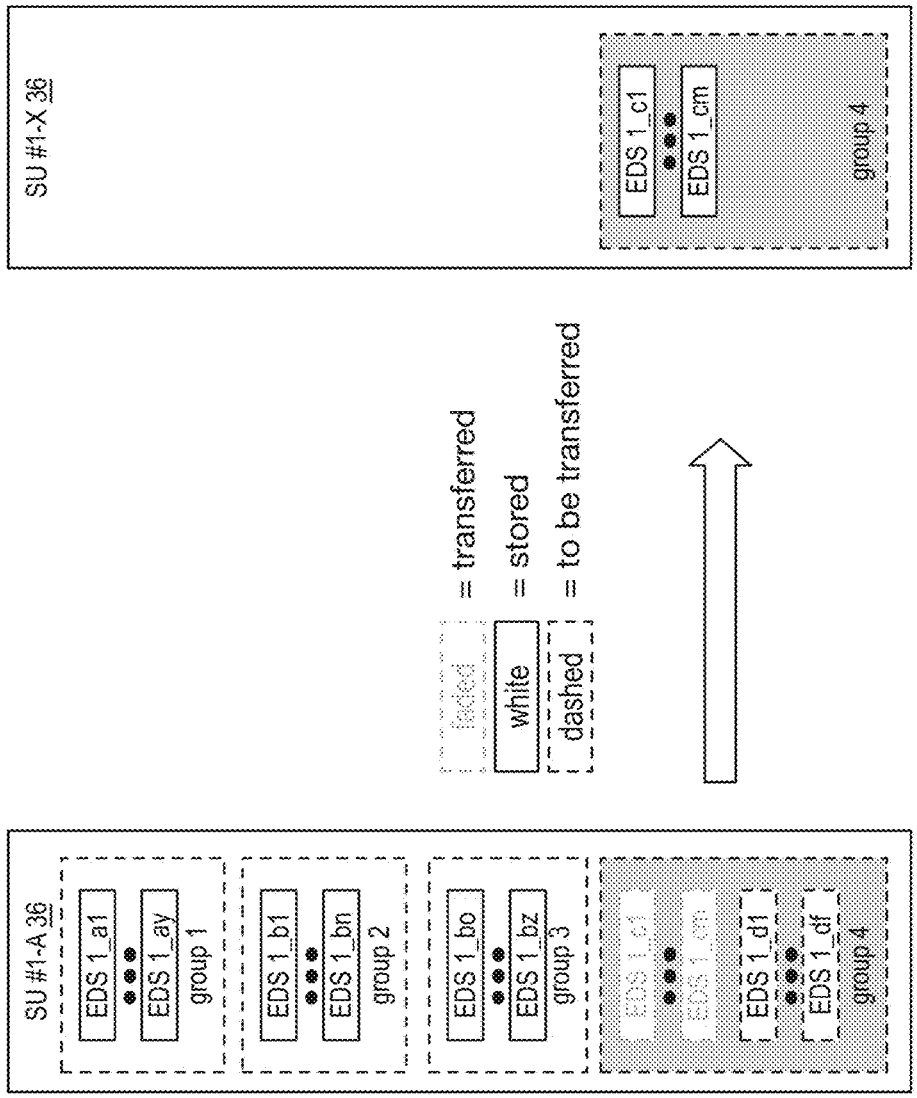
FIG. 9B is a schematic block diagram of an example of transferring a group of encoded data slices between storage units in accordance with the present invention.

FIG. 9B is a schematic block diagram of an example of transferring a group of encoded data slices between storage units SU 1-A and SU 1-X as result of a change to the distributed agreement protocol. Prior to the change, SU 1-A is determined to store a fourth group of encoded data slices (EDS $1\_c1$ through EDS $1\_cm$ and EDS $1\_d1$ through EDS $1\_df$). Note that a group of encoded data slices within a storage unit may be from a data object, a portion of a data object, or a plurality of data objects. Further note that each storage unit in a set of storage units will store corresponding groups of encoded data slices. For example, storage unit SU 2-A will store a fourth group of encoded data slices (EDS $2\_c1$ through EDS $2\_cm$ and EDS $2\_d1$ through EDS $2\_df$).

In this example, the change to the distributed agreement protocol causes group 4 of encoded data slices to be transferred from SU 1-A to SU 1-X. It will also cause the corresponding group 4 of encoded data slices to be transferred from SU 2-A to SU 2-X, SU 3-A to SU 3-X, SU 4-A to SU 4-X, and SU 5-A to SU 5-X. This example further illustrates that the transfer of encoded data slices from the SU 1-A to SU 1-X is in progress. For example, encoded data slices $1\_c1$ through $1\_cm$ have been successfully transferred, while encoded data slices $1\_d1$ through $1\_df$ have not been transferred. During the pendency of the encoded data slice transfer, one or more data access requests may be received for encoded data slices within group 4. Note that a group may include one or more encoded data slices that are identifiable based on at least a portion of the slice name (e.g., based on the object ID, the pillar number, the data segment number, revision information, a vault ID and/or identifying information). A method for processing data access requests during a data transfer is discussed with reference to FIG. 11.

Figure 10:
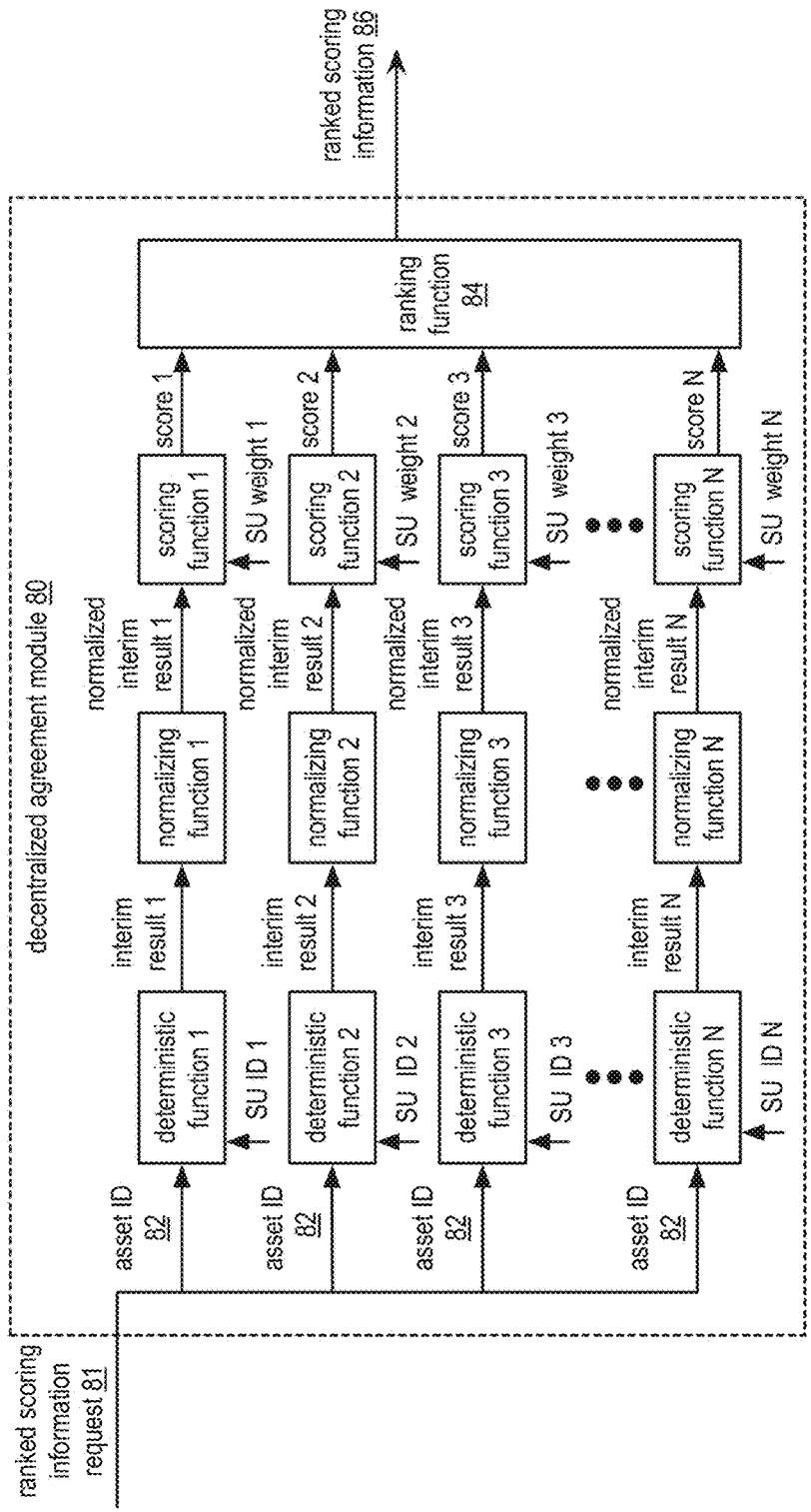
FIG. 10 is a schematic block diagram of an embodiment of decentralized or distributed agreement protocol in accordance with the present invention.

FIG. 10 is a schematic block diagram of an embodiment of a decentralized, or distributed, agreement module 80 that includes a set of deterministic functions 1-N, a set of normalizing functions 1-N, a set of scoring functions 1-N, and a ranking function 84. Each of the deterministic function, the normalizing function, the scoring function, and the ranking function 84, may be implemented utilizing the processing module 50 of FIG. 2. The decentralized agreement module 80 may be implemented utilizing any module, computing device, and/or unit of the dispersed storage network (DSN).

The decentralized, or distributed, agreement module 80 functions to receive a ranked scoring information request 81 and to generate ranked scoring information 86 based on the ranked scoring information request 81 and other information. The ranked scoring information request 81 includes one or more of an asset identifier (ID) 82 (e.g., the information to identify the encoded data slice(s) of a group of encoded data slices) of an asset associated with the request, an asset type indicator, one or more location identifiers of locations associated with the DSN, one or more corresponding location weights, and a requesting entity ID. The asset includes any portion of data associated with the DSN including one or more asset types including a data object, a data record, an encoded data slice, a data segment, a set of encoded data slices, and a plurality of sets of encoded data slices. As such, the asset ID 82 of the asset includes one or more of a data name, a data record identifier, a source name, a slice name, and a plurality of sets of slice names.

Each location of the DSN includes an aspect of a DSN resource. Examples of locations includes one or more of a storage unit, a memory device of the storage unit, a site, a storage pool of storage units, a pillar index associated with each encoded data slice of a set of encoded data slices generated by an information dispersal algorithm (IDA), a computing device 12-16, an integrity processing unit 20, and/or a managing unit 18.

Each location is associated with a location weight based on one or more of a resource prioritization of utilization scheme and physical configuration of the DSN. The location weight includes an arbitrary bias which adjusts a proportion of selections to an associated location such that a probability that an asset will be mapped to that location is equal to the location weight divided by a sum of all location weights for all locations of comparison. For example, each storage pool of a plurality of storage pools is associated with a location weight based on storage capacity. For instance, storage pools with more storage capacity are associated with higher location weights than others. The other information may include a set of location identifiers and a set of location weights associated with the set of location identifiers. For example, the other information includes location identifiers and location weights associated with a set of memory devices of a storage unit when the requesting entity utilizes the decentralized agreement module 80 to produce ranked scoring information 86 with regards to selection of a memory device of the set of memory devices for accessing a particular encoded data slice (e.g., where the asset ID includes a slice name of the particular encoded data slice).

The decentralized agreement module 80 outputs substantially identical ranked scoring information for each ranked scoring information request that includes substantially identical content of the ranked scoring information request. For example, a first requesting entity issues a first ranked scoring information request to the decentralized agreement module 80 and receives first ranked scoring information. A second requesting entity issues a second ranked scoring information request to the decentralized agreement module and receives second ranked scoring information. The second ranked scoring information is substantially the same as the first ranked scoring information when the second ranked scoring information request is substantially the same as the first ranked scoring information request.

As such, two or more requesting entities may utilize the decentralized agreement module 80 to determine substantially identical ranked scoring information. As a specific example, the first requesting entity selects a first storage pool of a plurality of storage pools for storing a set of encoded data slices utilizing the decentralized agreement module 80 and the second requesting entity identifies the first storage pool of the plurality of storage pools for retrieving the set of encoded data slices utilizing the decentralized agreement module 80.

In an example of operation, the decentralized agreement module 80 receives the ranked scoring information request 81. Each deterministic function performs a deterministic function on a combination and/or concatenation (e.g., add, append, interleave) of the asset ID 82 of the ranked scoring information request 81 and an associated location ID of the set of location IDs to produce an interim result. The deterministic function includes at least one of a hashing function, a hash-based message authentication code function, a mask generating function, a cyclic redundancy code function, hashing module of a number of locations, consistent hashing, rendezvous hashing, and a sponge function. As a specific example, deterministic function 2 appends a location ID 2 of a storage pool 2 to a source name as the asset ID to produce a combined value and performs the mask generating function on the combined value to produce interim result 2.

With a set of interim results 1-N, each normalizing function performs a normalizing function on a corresponding interim result to produce a corresponding normalized interim result. The performing of the normalizing function includes dividing the interim result by a number of possible permutations of the output of the deterministic function to produce the normalized interim result. For example, normalizing function 2 performs the normalizing function on the interim result 2 to produce a normalized interim result 2.

With a set of normalized interim results 1-N, each scoring function performs a scoring function on a corresponding normalized interim result to produce a corresponding score. The performing of the scoring function includes dividing an associated location weight by a negative log of the normalized interim result. For example, scoring function 2 divides location weight 2 of the storage pool 2 (e.g., associated with location ID 2) by a negative log of the normalized interim result 2 to produce a score 2.

With a set of scores 1-N, the ranking function 84 performs a ranking function on the set of scores 1-N to generate the ranked scoring information 86. The ranking function includes rank ordering each score with other scores of the set of scores 1-N, where a highest score is ranked first. As such, a location associated with the highest score may be considered a highest priority location for resource utilization (e.g., accessing, storing, retrieving, etc. the given asset of the request). Having generated the ranked scoring information 86, the decentralized agreement module 80 outputs the ranked scoring information 86 to the requesting entity.

Figure 11:
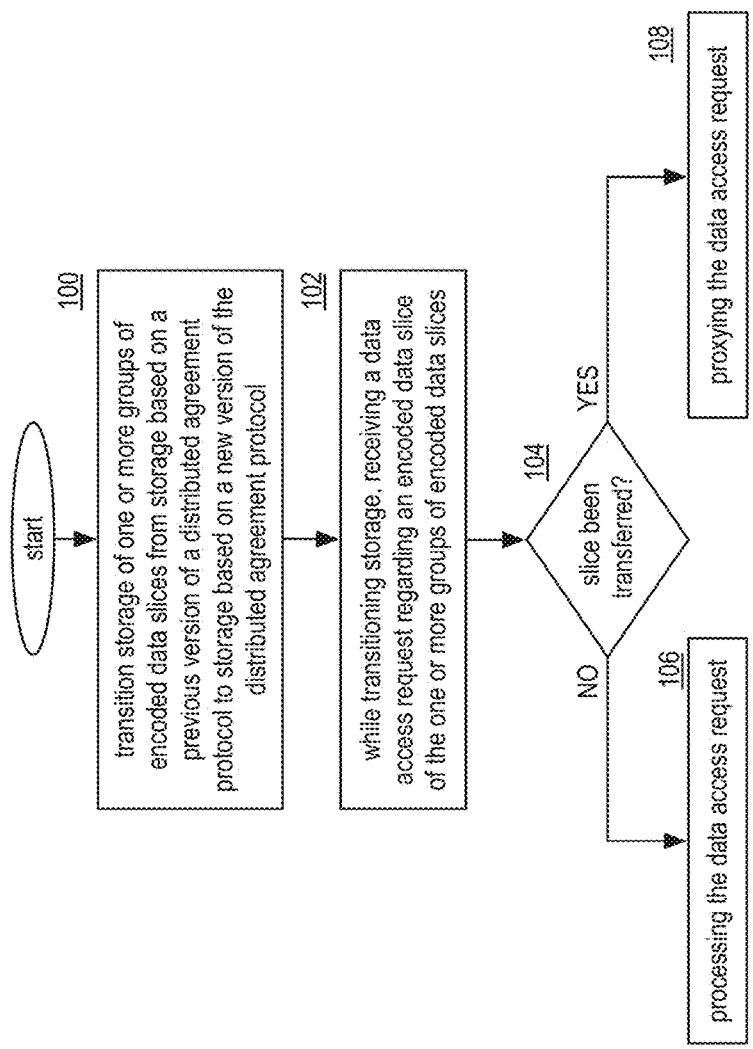
FIG. 11 is a logic diagram of an example of a method of processing data access requests during a data transfer in accordance with the present invention.

FIG. 11 is a flowchart illustrating an example of processing a data access request while in transition from a previous version of a distributed agreement protocol (e.g., previous set of coefficients used in FIG. 10) to storage based on a new version of the distributed agreement protocol (e.g., new set of coefficients used in FIG. 10). The method begins with step 100, where a storage unit (e.g., SU 1-A) of a dispersed storage network is transitioning storage of one or more groups of encoded data slices from storage based on a previous version of a distributed agreement protocol to storage based on a new version of the distributed agreement protocol (e.g., to SU 1-X). An example of this is provided in FIG. 9A.

The method continues at step 102, where, while transitioning storage of the one or more groups of encoded data slices, the storage unit receives, from a requesting computing device, a data access request regarding an encoded data slice of the one or more groups of encoded data slices. For example, the data access request is based on the previous version of the distributed agreement protocol.

The method continues at step 104, where the storage unit determines whether the encoded data slice has been transferred as a result of the transitioning. If not, the method continues at step 106 where the storage unit processes the data access request (e.g., read, write, list, status, etc.). If the encoded data slice has been transferred, the method continues at step 108 where the storage unit proxies the data access request via the other storage unit.

For example, when the other storage unit has received the transfer of the encoded data slice, the storage unit receives the data access request. Knowing that the encoded data slice has been transferred, the storage unit forwards the data access request to the other storage unit and requests that the response is to be returned to the storage unit or to the requesting entity. When the request includes sending the response to the storage unit, it receives an access response (e.g., the encoded data slice for a read operation, a success write response, etc.) from the other storage unit. The storage unit then sends the access response to the requesting computing device (e.g., one of computing devices 12-16).

As an alternative example, the storage unit receives, from the requesting computing device via another storage unit, the data access request. In this example, the data access request is based on the new version of the distributed agreement protocol and the encoded data slice has not yet been transferred to the other storage unit. This alternative continues with the storage unit processing the data access request to produce a data access response (e.g., the encoded data slice for a read operation, a success write response, etc.). The storage unit then sends the data access response to the other storage unit, which forwards the response to the requesting computing device.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a storage unit of a dispersed storage network (DSN), the method comprises:

transitioning storage of one or more groups of encoded data slices from storage based on a previous version of a distributed agreement protocol to storage based on a new version of the distributed agreement protocol, wherein the transitioning includes executing the new version of the distributed agreement protocol to identify the one or more groups of encoded data slices, wherein the distributed agreement protocol includes: a plurality of functions operable to generate a plurality of scoring values based on a plurality of storage unit identifiers, a plurality of corresponding storage unit weights, and one or more asset identifiers corresponding to the one or more groups of encoded data slices; and a ranking function that processes the plurality of scoring values to identify at least one another storage unit to which one or more encoded data slices of the one or more groups of encoded data slices are to be transferred; and while transitioning storage of the one or more groups of encoded data slices:

receiving, from a requesting computing device, a data access request regarding an encoded data slice of the one or more groups of encoded data slices;

determining whether the encoded data slice has been transferred as a result of the transitioning;

when the storage unit is currently storing the encoded data slice, processing the data access request; and when the storage unit is not currently storing the encoded data slice, functioning as a proxy for the requesting computing device to fulfill the data access request.

2. The method of claim 1 further comprises:

receiving the data access request based on the previous version of the distributed agreement protocol, wherein the encoded data slice is of a first group of encoded data slices and wherein the first group of encoded data slices is stored by the storage unit; and processing the data access request.

3. The method of claim 1 further comprises:

receiving the data access request based on the previous version of the distributed agreement protocol, wherein the encoded data slice is of a first group of encoded data slices and wherein the first group of encoded data slices is stored by another storage unit;

forwarding, by the storage unit, the data access request to the other storage unit;

receiving, by the storage unit, an access response from the other storage unit; and sending, by the storage unit, the access response to the requesting computing device.

4. The method of claim 1 further comprises:

receiving, from the requesting computing device via another storage unit, the data access request, wherein the data access request is based on the new version of the distributed agreement protocol, wherein the encoded data slice is of a first group of encoded data slices and wherein the first group of encoded data slices is stored by the storage unit, and wherein the other computing device is functioning as a proxy for the storage unit;

processing the data access request to produce a data access response; and sending the data access response to the other storage unit.

5. The method of claim 1, wherein a group of the one or more groups of encoded data slices is based on a range of slice names regarding a plurality of sets of encoded data slices.

6. A storage unit comprises:

an interface;

a memory; and a processing module operable to:

transition storage of one or more groups of encoded data slices from storage based on a previous version of a distributed agreement protocol to storage based on a new version of the distributed agreement protocol; and while transitioning storage of the one or more groups of encoded data slices:

receive, from a requesting computing device, a data access request regarding an encoded data slice of the one or more groups of encoded data slices;

determining whether the encoded data slice has been transferred as a result of the transitioning;

when the storage unit is currently storing the encoded data slice, process the data access request; and when the storage unit is not currently storing the encoded data slice, function as a proxy for the requesting computing device to fulfill the data access request, wherein the function as a proxy includes receiving the data access request based on the previous version of the distributed agreement protocol, wherein the encoded data slice is of a first group of encoded data slices and wherein the first group of encoded data slices is stored by another storage unit, forwarding, by the storage unit, the data access request to the other storage unit, receiving, by the storage unit, an access response from the other storage unit, wherein the access response includes the encoded data slice, and sending, by the storage unit, the access response to the requesting computing device.

7. The storage unit of claim 6, wherein the processing module further functions to:

receive the data access request based on the previous version of the distributed agreement protocol, wherein the encoded data slice is of a first group of encoded data slices and wherein the first group of encoded data slices is stored by the storage unit; and process the data access request.

8. The storage unit of claim 6, wherein the processing module further functions to:

receive, from the requesting computing device via another storage unit, the data access request, wherein the data access request is based on the new version of the distributed agreement protocol, wherein the encoded data slice is of a first group of encoded data slices and wherein the first group of encoded data slices is stored by the storage unit, and wherein the other computing device is functioning as a proxy for the storage unit;

process the data access request to produce a data access response; and send the data access response to the other storage unit.

9. The storage unit of claim 6, wherein the processing module further functions to transition storage of the one or more groups of encoded data slices by:

executing the new version of the distributed agreement protocol to identify the one or more groups of encoded data slices, wherein the distributed agreement protocol includes:
a plurality of functions operable to generate a plurality of scoring values based on a plurality of storage unit identifiers, a plurality of corresponding storage unit weights, and one or more asset identifiers corresponding to the one or more groups of encoded data slices; and
a ranking function that processes the plurality of scoring values to identify at least one another storage unit to which one or more encoded data slices of the one or more groups of encoded data slices are to be transferred.

10. The storage unit of claim 6, wherein a group of the one or more groups of encoded data slices is based on a range of slice names regarding a plurality of sets of encoded data slices.

11. A computer readable memory device comprises:
a first memory element that stores operational instructions that, when executed by a storage unit, causes the storage unit to:
transition storage of one or more groups of encoded data slices from storage based on a previous version of a distributed agreement protocol to storage based on a new version of the distributed agreement protocol; and
a second memory element that stores operational instructions that, when executed by a storage unit, causes the storage unit to:
execute the new version of the distributed agreement protocol to identify the one or more groups of encoded data slices, wherein the distributed agreement protocol includes:
a plurality of functions operable to generate a plurality of scoring values based on a plurality of storage unit identifiers, a plurality of corresponding storage unit weights, and one or more asset identifiers corresponding to the one or more groups of encoded data slices; and
a ranking function that processes the plurality of scoring values to identify at least one another storage unit to which one or more encoded data slices of the one or more groups of encoded data slices are to be transferred; and
while transitioning storage of the one or more groups of encoded data slices:
receive, from a requesting computing device, a data access request regarding an encoded data slice of the one or more groups of encoded data slices;
determine whether the encoded data slice has been transferred as a result of the transitioning;
when the storage unit is currently storing the encoded data slice, process the data access request; and
when the storage unit is not currently storing the encoded data slice, function as a proxy for the requesting computing device to fulfill the data access request.

12. The computer readable memory device of claim 11 further comprises:
receiving the data access request based on the previous version of the distributed agreement protocol, wherein the encoded data slice is of a first group of encoded data slices and wherein the first group of encoded data slices is stored by the storage unit; and
processing the data access request.

13. The computer readable memory device of claim 11 further comprises:
receiving the data access request based on the previous version of the distributed agreement protocol, wherein the encoded data slice is of a first group of encoded data slices and wherein the first group of encoded data slices is stored by another storage unit;
forwarding, by the storage unit, the data access request to the other storage unit;
receiving, by the storage unit, an access response from the other storage unit; and
sending, by the storage unit, the access response to the requesting computing device.

14. The computer readable memory device of claim 11 further comprises:
receiving, from the requesting computing device via another storage unit, the data access request, wherein the data access request is based on the new version of the distributed agreement protocol, wherein the encoded data slice is of a first group of encoded data slices and wherein the first group of encoded data slices is stored by the storage unit, and wherein the other computing device is functioning as a proxy for the storage unit;
processing the data access request to produce a data access response; and
sending the data access response to the other storage unit.

* * * * *